United States Patent
Taylor et al.

(10) Patent No.: US 7,293,611 B2
(45) Date of Patent: Nov. 13, 2007

(54) $CO_2$ MISCIBLE OPTIMIZED HYDROCARBON BLENDS AND METHODS OF USING $CO_2$ MISCIBLE OPTIMIZED HYDROCARBON BLENDS

(75) Inventors: Robert S. Taylor, Calgary (CA); Gary P. Funkhouser, Duncan, OK (US); Ronald G. Dusterhoft, Katy, TX (US); Robert S. Lestz, Missouri City, TX (US)

(73) Assignees: Halliburton Energy Services, Inc., Duncan, OK (US); Chevron U.S.A. Inc., San Ramon, CA (US)

( * ) Notice: Subject to any disclaimer, the term of this patent is extended or adjusted under 35 U.S.C. 154(b) by 200 days.

(21) Appl. No.: 10/787,363

(22) Filed: Feb. 26, 2004

(65) Prior Publication Data

US 2005/0189110 A1    Sep. 1, 2005

(51) Int. Cl.
*E21B 43/26* (2006.01)
*C09K 8/60* (2006.01)

(52) U.S. Cl. .............. 166/308.4; 166/305.1; 166/300; 507/202; 507/203; 507/922

(58) Field of Classification Search ........ 166/304, 166/308.4, 308.6, 305.1, 202, 2.3, 922; 507/202, 507/203, 922
See application file for complete search history.

(56) References Cited

U.S. PATENT DOCUMENTS

| | | | | |
|---|---|---|---|---|
| 3,846,310 A | 11/1974 | Blackwell et al. | ......... | 252/8.55 |
| 3,954,626 A * | 5/1976 | Greminger et al. | ......... | 507/216 |
| 4,622,155 A | 11/1986 | Harris et al. | ................ | 507/238 |
| 4,701,270 A | 10/1987 | Bullen et al. | ................ | 507/203 |
| 4,825,952 A | 5/1989 | Mzik | ......................... | 166/308 |
| 5,057,233 A | 10/1991 | Huddleston | ................. | 507/238 |
| 5,110,485 A | 5/1992 | Huddleston | ................. | 507/238 |
| 5,202,035 A | 4/1993 | Huddleston | ................. | 507/238 |
| 5,417,287 A | 5/1995 | Smith et al. | ................ | 166/308 |
| 5,571,315 A | 11/1996 | Smith et al. | ................ | 106/285 |
| 5,614,010 A | 3/1997 | Smith et al. | ................ | 16/285 |
| 5,846,915 A | 12/1998 | Smith et al. | ................ | 507/269 |
| 6,149,693 A | 11/2000 | Geib | ......................... | 44/270 |
| 6,271,409 B1 | 8/2001 | Geib | ......................... | 558/177 |
| 6,297,201 B1 | 10/2001 | Geib | ......................... | 507/244 |
| 6,342,468 B1 | 1/2002 | Geib | ......................... | 507/238 |
| 6,387,137 B1 | 5/2002 | Geib | ......................... | 44/270 |
| 6,511,944 B2 | 1/2003 | Taylor et al. | ............... | 507/237 |
| 6,544,934 B2 | 4/2003 | Taylor et al. | ............... | 507/238 |
| 2003/0228985 A1 | 12/2003 | Taylor et al. | ............... | 507/238 |
| 2004/0214728 A1 | 10/2004 | Taylor et al. | ............... | 507/235 |
| 2005/0189111 A1 | 9/2005 | Taylor et al. | ............... | 166/278 |

FOREIGN PATENT DOCUMENTS

EP    1 236 863 A1    4/2002

OTHER PUBLICATIONS

R. Taylor et al., *Optimized Gas-Well Stimulation Using CO2-Miscible, Viscosified Hydrocarbon Fracturing Fluids*, Soc'y of Petroleum Engineers 75666 (2002).
Search Report and The Written Opinion of PCT/GB2005/000629, Feb. 21, 2005.

* cited by examiner

*Primary Examiner*—David Bagnell
*Assistant Examiner*—Nicole Coy
(74) *Attorney, Agent, or Firm*—Robert A. Kent; Baker Botts

(57) ABSTRACT

A method of treating a subterranean formation comprising the steps of providing a servicing fluid comprising carbon dioxide and a hydrocarbon blend, wherein the hydrocarbon blend comprises at least about 65% hydrocarbons having from six carbons ($C_6$) to eleven carbons ($C_{11}$); and placing the servicing fluid into the subterranean formation. A subterranean servicing fluid comprising carbon dioxide and a hydrocarbon blend wherein the hydrocarbon blend comprises and at least about 65% hydrocarbons having from six carbons ($C_6$) to eleven carbons ($C_{11}$).

30 Claims, No Drawings

CO$_2$ MISCIBLE OPTIMIZED HYDROCARBON BLENDS AND METHODS OF USING CO$_2$ MISCIBLE OPTIMIZED HYDROCARBON BLENDS

BACKGROUND

The present invention relates to servicing fluids for use in subterranean operations. More particularly, the present invention relates to improved servicing fluids comprising optimized hydrocarbon blends and carbon dioxide and methods of using such servicing fluids in subterranean formations.

Servicing fluids are used in a variety of operations and treatments performed in oil and gas wells. Such operations and treatments include, but are not limited to, production stimulation operations, such as fracturing, and well completion operations, such as gravel packing.

An example of a production stimulation operation using a servicing fluid having particles suspended therein is hydraulic fracturing. That is, a type of servicing fluid, referred to in the art as a fracturing fluid, is pumped through a well bore into a subterranean zone to be stimulated at a rate and pressure such that fractures are formed or enhanced in a desired subterranean zone. The fracturing fluid is generally a gel, emulsion, or foam that may comprise a particulate material often referred to as proppant. When used, proppant is deposited in the fracture and functions, inter alia, to hold the fracture open while maintaining conductive channels through which such produced fluids can flow upon completion of the fracturing treatment and release of the attendant hydraulic pressure.

An example of a well completion operation using a servicing fluid having particles suspended therein is gravel packing. Gravel packing treatments are used, inter alia, to reduce the migration of unconsolidated formation particulates into the well bore. In gravel packing operations, particulates, referred to in the art as gravel, are carried to a well bore in a subterranean producing zone by a servicing fluid known as a carrier fluid. That is, the particulates are suspended in a carrier fluid, which may be viscosified, and the carrier fluid is pumped into a well bore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the well bore. While screenless gravel packing operations are becoming more common, traditional gravel pack operations involve placing a gravel pack screen in the well bore and packing the surrounding annulus between the screen and the well bore with gravel designed to prevent the passage of formation particulates through the pack with produced fluids, wherein the well bore may be oriented from vertical to horizontal and may extend from hundreds to thousands of feet. When installing the gravel pack, the gravel is carried to the formation in the form of a slurry by mixing the gravel with a viscosified carrier fluid. Such gravel packs may be used to stabilize a formation while causing minimal impairment to well productivity. The gravel, inter alia, acts to prevent the particulates from occluding the screen or migrating with the produced fluids, and the screen, inter alia, acts to prevent the gravel from entering the well bore.

In some situations the processes of hydraulic fracturing and gravel packing are combined into a single treatment to provide a stimulated production and an annular gravel pack to prevent formation sand production. Such treatments are often referred to as "frac pack" operations. In some cases the treatments are completed with a gravel pack screen assembly in place with the hydraulic fracturing treatment being pumped through the annular space between the casing and screen. In this situation the hydraulic fracturing treatment ends in a screen out condition creating an annular gravel pack between the screen and casing. This allows both the hydraulic fracturing treatment and gravel pack to be placed in a single operation. In other cases the fracturing treatment may be performed prior to installing the screen and placing a gravel pack.

In carrying out hydraulic fracturing, frac packing, and gravel packing, fluid recovery oftentimes is critical. Foamed fluids have been developed in part to provide enhanced fluid recovery through energization by a compressed gas phase. They also reduce the total amount of liquid used, typically by a factor of about four. Such foamed fluids have included various surfactants, known as foaming and foam stabilizing agents, for facilitating the foaming and stabilization of the foam produced when a gas is mixed with a servicing fluid. Thus, foamed fluids may be thought of as media in which a relatively large volume of gas is dispersed in a relatively small volume of liquid, usually with the aid of a surfactant that reduces the surface tension of the fluid. The most commonly used gases for foamed fracture fluids are nitrogen, carbon dioxide, and/or combinations of the two. Foamed servicing fluids may be preferred over conventional servicing fluids because they generally provide superior fluid recovery as well as excellent fluid loss control without forming a substantial filter cake. Enhanced fluid recovery is provided by the expansion of the gas in the foam when the pressure is released after the stimulation and/or treatment. This promotes flow of residual servicing fluid liquid back into the well, which may aid in cleanup of the servicing fluid once the subterranean operation is complete.

The use of conventional servicing fluids in subterranean operations may present disadvantages. For example, high capillary pressures associated with the use of aqueous systems may restrict the flow of produced gaseous hydrocarbons such as methane. Capillary pressures of several thousand psi can result in low permeability formations, wherein the high differential pressures necessary to initiate gas flow can result in extended fluid recovery times, or permanent loss of effective fracture half length. Furthermore, use of water in undersaturated reservoirs can also reduce permeability and associated gas flow through permanent increase in water saturation of the reservoir.

SUMMARY OF THE INVENTION

The present invention relates to servicing fluids for use in subterranean operations. More particularly, the present invention relates to improved servicing fluids comprising optimized hydrocarbon blends and carbon dioxide and methods of using such servicing fluids in subterranean formations.

One embodiment of the present invention provides a method of treating a subterranean formation comprising the steps of providing a servicing fluid comprising carbon dioxide and a hydrocarbon blend, wherein the hydrocarbon blend comprises at least about 65% hydrocarbons having from six carbons ($C_6$) to eleven carbons ($C_{11}$); and placing the servicing fluid into the subterranean formation.

Another embodiment of the present invention provides a method of fracturing a subterranean formation comprising the step of placing a fracturing fluid comprising carbon dioxide and a hydrocarbon blend into the subterranean formation at a pressure sufficient to create at least one fracture therein wherein the hydrocarbon blend comprises at least about 65% hydrocarbons having from six carbons ($C_6$) to eleven carbons ($C_{11}$).

Still another embodiment of the present invention provides a method of drilling in a subterranean zone comprising the steps of providing a drill-in fluid comprising carbon dioxide and a hydrocarbon blend wherein the hydrocarbon blend comprises at least about 65% hydrocarbons having from six carbons ($C_6$) to eleven carbons ($C_{11}$) and drilling into a formation using the drill-in fluid so as to create a well bore penetrating a producing formation.

Another embodiment of the present invention provides a subterranean servicing fluid comprising carbon dioxide and a hydrocarbon blend wherein the hydrocarbon blend comprises and at least about 65% hydrocarbons having from six carbons ($C_6$) to eleven carbons ($C_{11}$).

Other and further features and advantages of the present invention will be readily apparent to those skilled in the art upon a reading of the description of preferred embodiments which follows.

DESCRIPTION OF THE PREFERRED EMBODIMENTS

The present invention relates to servicing fluids for use in subterranean operations. More particularly, the present invention relates to improved servicing fluids comprising optimized hydrocarbon blends and carbon dioxide and methods of using such servicing fluids in subterranean formations. While the compositions and methods of the present invention may be useful in a variety of applications, they are particularly useful for stimulation and well completion operations, such as, but not limited to, fracturing, gravel packing, frac pack applications, and drill-in operations performed in subterranean wells such as oil and gas wells.

The improved servicing fluids of the present invention generally comprise carbon dioxide and liquid hydrocarbon blends that comprise at least about 65% hydrocarbons having from six carbons ($C_6$) through eleven carbons ($C_{11}$). The hydrocarbon blends that are a component of the servicing fluids of the present invention, are comprised primarily of hydrocarbons of chain length $C_{10}$ or less. In certain embodiments, they are manageable as liquids (at standard conditions of about 60° F. and about 1 atmosphere (14.7 psi) pressure) and may be suitable for use with traditional equipment used in subterranean treatments. One advantage of these fluids is that they may exhibit increased volatility versus conventional servicing fluids, which may aid in recovering the fluid from the subterranean formation once the treatment (such as a fracturing, frac packing treatment, gravel pack treatment, or drill-in treatment) is complete. Generally speaking, the more volatile the hydrocarbon based servicing fluid, the greater the rate and completeness of fluid recovery. However, use of too volatile a servicing fluid may be impractical and may present a safety hazard. One advantage of the present invention is in providing an optimized hydrocarbon blend that provides enhanced volatility, while remaining safe to handle and pump with conventional equipment.

The carbon dioxide added to the hydrocarbon-based servicing fluids of the present invention acts, inter alia, to increase the rate of the servicing fluid's recovery from the subterranean formation. However, increasing concentrations of dissolved carbon dioxide in the liquid hydrocarbon make it progressively more difficult to gel with phosphate ester and alkylphosphonic acid ester gel systems. As a result there is a limit to the concentration of carbon dioxide that may be present in the servicing fluids. For instance, if too high a concentration of carbon dioxide is present, the servicing fluid may not have a viscosity sufficient to carry the needed quantity of particulates to a desired location within a well bore, to adequately control fluid leak off, and to generate the desired fracture geometry. In some embodiments of the present invention, the servicing fluid comprises from about 20 volume % to about 80 volume % carbon dioxide. Other embodiments of the present invention comprise from about 30 volume % to about 50 volume % carbon dioxide. It is within the ability of one skilled in the art, with the benefit of this disclosure, to determine the proper amount of carbon dioxide to add to the total servicing fluid.

The servicing fluids of the present invention may be particularly useful in low permeability formations, low reservoir pressure formations, and formations containing water-sensitive clays. When such formations are fractured with aqueous servicing fluids, high capillary pressure may result that may cause either slow fluid recovery or result in water blockage. Water blockage and, to a lesser extent, less than optimal fluid recovery may result in a loss of effective fracture length and, thus, may reduce the benefits of the fracturing operation. The use of $CO_2$ miscible gelled hydrocarbon fluids may overcome these limitations by achieving a miscible methane drive mechanism, where produced methane is used to displace the hydrocarbon fracturing fluid from the formation. To facilitate this process more volatile hydrocarbon blends can be used in place of fluids such as diesel fuel. The theory and application of this technology is described in R. Taylor et al., *Optimized Gas-Well Stimulation Using CO2-Miscible, Viscosified Hydrocarbon Fracturing Fluids*, SOC'Y OF PETROLEUM ENGINEERS 75666 (2002), the relevant disclosure of which is herein incorporated by reference. In addition, extended clean up may result in costly loss of production. Also, additional equipment such as a service rig for swabbing, or coiled tubing in combination with $N_2$, to remove liquids from the well bore may be required.

Other embodiments of the servicing fluids of the present invention may comprise hydrocarbon blends that comprise carbon dioxide and at least about 65% hydrocarbons having from seven carbons ($C_7$) through ten carbons ($C_{10}$). In still other embodiments, the hydrocarbon blend may comprise less than about 1% hydrocarbons greater than $C_{10}$, or less than about 1% hydrocarbons below $C_7$, or both. In preferred embodiments, the hydrocarbon blends of the present invention exhibit a Reid Vapor Pressure below about 2 psi. Reid Vapor Pressure is a measurement of a fluid's volatility. Industry standards generally call for maintaining the Reid Vapor Pressure of servicing fluids below about 2 psi to help ensure that the servicing fluid is safe for use.

In some embodiments of the present invention, the hydrocarbon blends of the present invention may be gelled with a gelling agent to provide a gelled servicing fluid. Any gelling agent known by those skilled in the art to be suitable for gelling hydrocarbon-based fluids may be suitable for use in the present invention. For example, suitable gelling agents may include ferric iron or aluminum polyvalent metal complexes of orthophosphoric acid esters and ferric iron or aluminum polyvalent metal complexes of alkylphosphonic acid esters, and ferric iron or aluminum polyvalent metal complexes of unsymmetrical dialkylphosphinic acids. Examples of such iron or aluminum polyvalent metal salts of alkylphosphonic acid esters are provided in Taylor et al., U.S. Pat. No. 6,511,944, issued on Jan. 28, 2003, the relevant disclosure of which is incorporated herein by reference. The gelling agent may be added to the servicing fluids of the present invention in an amount sufficient to provide enhanced viscosity. In an exemplary embodiment, the gelling agent may be present in servicing fluids of the present invention in an amount in the range of from about 0.1% to about 2.5% by weight of the servicing fluids.

In a further embodiment, the servicing fluids may further comprise a gel breaker. Any gel breaker known by those skilled in the art to be suitable for use with gelled hydrocarbon-based fluids may be suitable for use to in the present invention. Examples of such gel breakers are provided in Taylor et al., U.S. Pat. No. 6,544,934, issued on Apr. 8, 2003, the disclosure of which is incorporated herein by reference.

In another embodiment the servicing fluids of the present invention may include any of the various servicing fluid additives commonly used in the art. Such additives include, but are not limited to, particulates, delayed breakers, surfactants, fluid loss additives, and weighting materials.

In other exemplary embodiments, the carbon dioxide miscible hydrocarbon blends of the present invention may be combined with a liquefied petroleum gas ("LPG"). As used herein, the term LPG refers to a hydrocarbon provided in a liquid state that is a gas at standard conditions (about 60° F. and about 1 atmosphere (14.7 psi) pressure). For example, such hydrocarbons may include, but are not limited to, methane, ethane, propane, butane and iso-butane. In exemplary embodiments, LPG fluids of the present invention may further comprise other hydrocarbon components that are a liquid at standard conditions, having five carbon atoms or more, which are present in commercial supplies of LPG. The hydrocarbon blends of the present invention are suitable for use as servicing fluids in both gelled and ungelled forms and may be combined with a gelled or ungelled LPG. In an alternative embodiment, the combination may include any of the various servicing fluid additives commonly used in the art. Such additives include, but are not limited to, particulates, delayed breakers, surfactants, fluid loss additives, and weighting materials.

In some embodiments, a carbon dioxide miscible hydrocarbon blend servicing fluid of the present invention may be combined with an LPG servicing fluid at the well head to create a combined servicing fluid that may be directly used in a subterranean formation. In such embodiments, traditional equipment can be used to create a servicing fluid according to the present invention that may comprise particulates and/or any of the various servicing fluid additives commonly used in the art. The carbon dioxide miscible hydrocarbon blends and the LPG fluids may be combined in amounts sufficient to provide the desired treatment effect, such as stimulation and/or a desired completion of the subterranean formation, as well as provide maximum fluid recovery from the subterranean formation. In some embodiments of the present invention, it may be desirable to alter the relative percentages of the hydrocarbon blend to the LPG fluid for a particular servicing application. For example, where a servicing fluid comprising the carbon dioxide miscible hydrocarbon blends of the present invention and LPG is used as a fracturing fluid, it may be desirable to begin using a fluid comprising 100% LPG. During the fracturing application, the percentage of the hydrocarbon blend may increase or fluctuate, as needed, to effect the desired subterranean treatment including desired down hole proppant concentrations.

In certain embodiments, the servicing fluids of the present invention may further comprise particulates, such as gravel or proppant. For example, the servicing fluids of the present application are well suited to be used as fracturing fluids, gravel packing fluids, and fluids used during frac pack operations. Particulates used in accordance with the present invention are generally of a size such that formation particulates that may migrate with produced fluids are prevented from being produced from the subterranean formation. Any suitable particulate may be used including, but not limited to, graded sand, bauxite, ceramic materials, glass materials, nut hulls, polymer beads, and the like. Generally, the particulates have a size in the range of from about 4 to about 400 mesh, U.S. Sieve Series. In an exemplary embodiment, the particulates may be present in the servicing fluids of the present invention in an amount less than about 14 lbs/gallon of the servicing fluids. In other embodiments, the particulates may be present in the servicing fluids of the present invention in an amount less than about 10 lbs/gallon of the servicing fluids. One of ordinary skill in the art with the benefit of this disclosure will be able to determine the type and amount of particulate suitable for use in the operation at issue.

One method of the present invention provides an improved method of fracturing a desired zone in a subterranean formation using an improved servicing fluid of the present invention. In some such fracturing methods, a fracturing fluid comprising at least about 65% hydrocarbons having from six carbons ($C_6$) and through eleven carbons ($C_{11}$) is placed in the subterranean formation at a rate and pressure sufficient to form or enhance at least one fracture in the subterranean formation, and then the fracturing fluid is substantially removed from the subterranean formation. In some embodiments of the present invention, a fracturing fluid may further comprise proppant. Also, in some embodiments of the present invention, the fracturing fluid comprising at least about 65% hydrocarbons from $C_6$ through $C_{11}$ may be combined with an LPG fluid before it is placed into the subterranean formation. In methods wherein a servicing fluid comprising at least about 65% hydrocarbons from $C_6$ through $C_{11}$ is combined with an LPG fluid, the relative percentages of LPG fluid to $C_6$-$C_{11}$ fluid may remain constant throughout the fracturing treatment or may be varied. One skilled in the art will recognize that the fracturing methods referred to above may also be used in "frac packing" operations wherein the fracture operation is allowed to screenout and form a gravel pack in conjunction with a proppant filled fracture.

Another method of the present invention provides an improved method of gravel packing using a servicing fluid of the present invention. In some such gravel packing methods, a gravel packing fluid, comprising at least about 65% hydrocarbons between $C_6$ and $C_{11}$ and having gravel suspended therein, is placed in a region of a well bore such that at least a portion of the gravel particles form a gravel pack substantially adjacent to the well bore. The gravel packing fluid is then substantially removed from the subterranean formation. In some embodiments of the present invention, a gravel packing fluid comprising at least about 65% hydrocarbons from $C_6$ through $C_{11}$ may be combined with a LPG fluid before it is placed into the well bore. In methods wherein a servicing fluid comprising at least about 65% hydrocarbons from $C_6$ through $C_{11}$ is combined with a LPG fluid, the relative percentages of LPG fluid to the $C_6$-$C_{11}$ fluid may remain constant throughout the fracturing treatment or may be varied.

Another method of the present invention provides a method of drilling a well bore penetrating one or more crude oil producing zones using a drill-in fluid of the present invention. In some such gravel packing methods, a drill-in fluid, comprising at least about 65% hydrocarbons between $C_6$ and $C_{11}$, is used as to drill a well bore and then substantially removed from the subterranean formation. In some embodiments of the present invention, a drill-in fluid comprising at least about 65% hydrocarbons from $C_6$ through $C_{11}$ may be combined with a LPG fluid before it is placed into the well bore.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a subterranean formation comprising the steps of:
   providing a servicing fluid comprising carbon dioxide and a hydrocarbon blend, wherein the hydrocarbon blend comprises at least about 65% hydrocarbons having from seven carbons ($C_7$) to ten carbons ($C_{10}$); and
   placing the servicing fluid into the subterranean formation.

2. The method of claim 1 wherein about 85% of the hydrocarbon blend comprises hydrocarbons having eight carbons ($C_8$), hydrocarbons having nine carbons ($C_9$), or a mixture of hydrocarbons having eight carbons ($C_8$) and hydrocarbons having nine carbons ($C_9$).

3. The method of claim 1 wherein the hydrocarbon blend has a Reid Vapor pressure below about 2 psi.

4. The method of claim 1 wherein the hydrocarbon blend comprises less than about 1% hydrocarbons having more than ten carbons ($C_{10}$).

5. The method of claim 1 wherein the hydrocarbon blend comprises less than about 1% hydrocarbons having fewer than seven carbons ($C_7$).

6. The method of claim 1 wherein the servicing fluid further comprises a gelling agent present in an amount in the range of from about 0.1% to about 2.5% by weight of the hydrocarbon blend.

7. The method of claim 6 wherein the gelling agent is selected from the group consisting of ferric iron polyvalent metal complexes of alkylphosphonic acid esters, aluminum polyvalent metal complexes of alkylphosphonic acid esters, and combinations thereof.

8. The method of claim 6 wherein the gelling agent is selected from the group consisting of ferric iron polyvalent metal complexes of orthophosphoric acid esters, aluminum polyvalent metal complexes of orthophosphoric acid esters, and combinations thereof.

9. The method of claim 6 wherein the gelling agent is selected from the group consisting of ferric iron polyvalent metal complexes of unsymmetrical dialkylphosphinic acids, aluminum polyvalent metal complexes of unsymmetrical dialkylphosphinic acids, and combinations thereof.

10. The method of claim 1 wherein the servicing fluid further comprises a LPG fluid.

11. The method of claim 1 wherein the servicing fluid further comprises particulates.

12. The method of claim 1 wherein the servicing fluid further comprises a delayed gel breaker.

13. The method of claim 1 wherein the hydrocarbon blend comprises less than about 1% hydrocarbons having fewer than seven carbons ($C_7$), about 5% hydrocarbons having seven carbons ($C_7$); about 44% hydrocarbons having eight carbons ($C_8$); about 43% hydrocarbons having nine carbons ($C_9$); about 8% hydrocarbons having ten carbons ($C_{10}$); and less than about 1% hydrocarbons having more than ten carbons ($C_{10}$).

14. The method of claim 13 wherein the hydrocarbon blend comprises substantially no hydrocarbons having more than eleven carbons ($C_{11}$).

15. The method of claim 1 wherein the servicing fluid comprises from about 30 volume % to about 80 volume % carbon dioxide by volume of hydrocarbon blend.

16. A method of fracturing a subterranean formation comprising the step of placing a fracturing fluid comprising carbon dioxide and a hydrocarbon blend into the subterranean formation at a pressure sufficient to create at least one fracture therein wherein the hydrocarbon blend comprises at least about 65% hydrocarbons having from seven carbons ($C_7$) to ten carbons ($C_{10}$).

17. The method of claim 16 wherein about 85% of the hydrocarbon blend comprises hydrocarbons having eight carbons ($C_8$), hydrocarbons having nine carbons ($C_9$), or a mixture of hydrocarbons having eight carbons ($C_8$) and hydrocarbons having nine carbons ($C_9$).

18. The method of claim 16 wherein the hydrocarbon blend has a Reid Vapor pressure below about 2 psi.

19. The method of claim 16 wherein the hydrocarbon blend comprises less than about 1% hydrocarbons having more than 10 carbons ($C_{10}$).

20. The method of claim 16 wherein the hydrocarbon blend comprises less than about 1% hydrocarbons having fewer than seven carbons ($C_7$).

21. The method of claim 16 wherein the fracturing fluid further comprises a gelling agent present in an amount in the range of from about 0.1% to about 2.5% by weight of the hydrocarbon blend.

22. The method of claim 21 wherein the gelling agent is selected from the group consisting of ferric iron polyvalent metal complexes of alkylphosphonic acid esters, aluminum polyvalent metal complexes of alkylphosphonic acid esters, and combinations thereof.

23. The method of claim 21 wherein the gelling agent is selected from the group consisting of ferric iron polyvalent metal complexes of orthophosphoric acid esters, aluminum polyvalent metal complexes of orthophosphoric acid esters, and combinations thereof.

24. The method of claim 21 wherein the gelling agent is selected from the group consisting of ferric iron polyvalent metal complexes of unsymmetrical dialkylphosphinic acids, aluminum polyvalent metal complexes of unsymmetrical dialkylphosphinic acids, and combinations thereof.

25. The method of claim 16 wherein the fracturing fluid further comprises a LPG fluid.

26. The method of claim 16 wherein the fracturing fluid further comprises particulates.

27. The method of claim 16 wherein the fracturing fluid further comprises a delayed gel breaker.

28. The method of claim 16 wherein the hydrocarbon blend comprises less than about 1% hydrocarbons having fewer than seven carbons ($C_7$), about 5% hydrocarbons having seven carbons ($C_7$); about 44% hydrocarbons having eight carbons ($C_8$); about 43% hydrocarbons having nine carbons ($C_9$); about 8% hydrocarbons having ten carbons ($C_{10}$); and less than about 1% hydrocarbons having more than ten carbons ($C_{10}$).

29. The method of claim 28 wherein the hydrocarbon blend comprises substantially no hydrocarbons having more than eleven carbons ($C_{11}$).

30. The method of claim 16 wherein the servicing fluid comprises from about 30 volume % to about 80 volume % carbon dioxide.

* * * * *